(12) United States Patent
Moyer (10) Patent No.: US 7,376,807 B2
(45) Date of Patent: May 20, 2008

(54) DATA PROCESSING SYSTEM HAVING ADDRESS TRANSLATION BYPASS AND METHOD THEREFOR

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 289 days.

(21) Appl. No.: 11/360,926

(22) Filed: Feb. 23, 2006

(65) Prior Publication Data

US 2007/0198804 A1    Aug. 23, 2007

(51) Int. Cl.
*G06F 12/00*    (2006.01)

(52) U.S. Cl. .................. 711/202; 711/203; 711/205; 711/207; 711/138; 712/200

(58) Field of Classification Search ................. 711/202
See application file for complete search history.

(56) References Cited

U.S. PATENT DOCUMENTS

| | | | |
|---|---|---|---|
| 4,488,228 A | 12/1984 | Crudele et al. | |
| 4,493,035 A | 1/1985 | MacGregor et al. | |
| 4,524,415 A | 6/1985 | Mills, Jr. et al. | |
| 4,635,193 A | 1/1987 | Moyer et al. | |
| 4,763,244 A | 8/1988 | Moyer et al. | |
| 4,763,250 A | 8/1988 | Moyer et al. | |
| 4,800,489 A | 1/1989 | Moyer et al. | |
| 4,862,352 A | 8/1989 | Moyer et al. | |
| 4,888,688 A | 12/1989 | Hartvigsen et al. | |
| 4,890,223 A | 12/1989 | Cruess et al. | |
| 5,029,072 A | 7/1991 | Moyer et al. | |
| 5,239,642 A | 8/1993 | Gutierrez et al. | |
| 5,319,763 A | 6/1994 | Ho et al. | |
| 5,341,500 A | 8/1994 | Moyer et al. | |
| 5,375,216 A | 12/1994 | Moyer et al. | |
| 5,388,226 A | 2/1995 | Gutierrez et al. | |
| 5,535,351 A * | 7/1996 | Peng ........................... 711/207 |
| 5,666,509 A * | 9/1997 | McCarthy et al. ........... 711/206 |
| 5,732,405 A * | 3/1998 | Ho et al. ...................... 711/3 |
| 6,154,826 A | 11/2000 | Wulf et al. | |
| 6,185,657 B1 | 2/2001 | Moyer | |
| 6,519,684 B1 | 2/2003 | Moyer | |
| 6,748,558 B1 | 6/2004 | Gonzales et al. | |
| 6,766,431 B1 | 7/2004 | Moyer | |
| 6,859,875 B1 | 2/2005 | Moyer et al. | |
| 6,925,542 B2 | 8/2005 | Moyer et al. | |
| 6,963,963 B2 | 11/2005 | Moyer | |
| 2004/0186973 A1 | 9/2004 | Moyer et al. | |
| 2004/0193831 A1 | 9/2004 | Moyer | |
| 2005/0038973 A1 | 2/2005 | Ito et al. | |
| 2005/0125623 A1 | 6/2005 | Dale et al. | |

* cited by examiner

*Primary Examiner*—Donald Sparks
*Assistant Examiner*—Hashem Farrokh
(74) *Attorney, Agent, or Firm*—Joanna G. Chiu; Robert L. King (57) ABSTRACT

In a data processing system a processor including processing logic performs data processing. An address translator that is coupled to the processing logic performs address translation and a method thereof. The address translator receives a logical address and converts the logical address to both a physical address and one or more address attributes. Bypass circuitry that is coupled to the address translator selectively provides the logical address as a translated address of the logical address which was received. In order to speed up the memory address translation, the logical address is selectively provided as the translated address prior to providing the one or more address attributes associated with the logical address.

20 Claims, 5 Drawing Sheets

| NAME | DESCRIPTION |
|---|---|
| INSTRUCTION BYPASS 96 | BYPASS TRANSLATION FOR INSTRUCTION ACCESSES<br>0 – ADDRESS TRANSLATION CIRCUITRY TRANSLATES INSTRUCTION LOGICAL ADDRESS TO TRANSLATED LOGICAL ADDRESSES NORMALLY<br>1 – ADDRESS TRANSLATION CIRCUITRY BYPASSES THE INSTRUCTION LOGICAL ADDRESS DIRECTLY AS THE TRANSLATED ADDRESS<br><br>WHEN SET TO "1", A 1:1 ADDRESS MAPPING IS USED. ADDRESS TRANSLATOR LOOKUPS ARE STILL PERFORMED FOR PAGE ATTRIBUTE AND PROTECTION INFORMATION, AND ADDRESS TRANSLATOR MISSES CAN STILL OCCUR. |
| DATA BYPASS 98 | BYPASS TRANSLATION FOR DATA ACCESSES<br>0 – ADDRESS TRANSLATION CIRCUITRY TRANSLATES DATA LOGICAL ADDRESS TO TRANSLATED LOGICAL ADDRESSES NORMALLY<br>1 – ADDRESS TRANSLATION CIRCUITRY BYPASSES THE DATA LOGICAL ADDRESS DIRECTLY AS THE TRANSLATED ADDRESS<br><br>WHEN SET TO "1", A 1:1 ADDRESS MAPPING IS USED. ADDRESS TRANSLATOR LOOKUPS ARE STILL PERFORMED FOR PAGE ATTRIBUTE AND PROTECTION INFORMATION, AND ADDRESS TRANSLATOR MISSES CAN STILL OCCUR. |

DATA PROCESSING SYSTEM HAVING ADDRESS TRANSLATION BYPASS AND METHOD THEREFOR

FIELD OF THE INVENTION

This invention relates generally to data processors, and more specifically, to data processors having address translation bypass capabilities.

RELATED ART

In many data processing systems today, address translation is performed to translate logical addresses generated by a processor, such as a central processing unit, into physical addresses for use by a memory. However, the need for address translation typically results in a physical address being valid later within a clock cycle, which results in reduced setup times for the memories receiving the translated address. Therefore, in many cases, the need for address translation requires clocks to be run at a lower frequency in order to provide these memories with sufficient setup times, thus possibly reducing overall performance of the data processing system.

BRIEF DESCRIPTION OF THE DRAWINGS

The present invention is illustrated by way of example and is not limited by the accompanying figures, in which like references indicate similar elements.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As discussed above, the need for address translation within a data processing system may result in reduced setup times for memories needing the translated address and may result in requiring lower clock frequencies. In one embodiment of the present invention, bypass circuitry is utilized which, based upon bypass control logic, allows for address translation bypass. When address translation is bypassed, the logical address is provided directly as the translated address prior to completing address translation. In one embodiment, address translation includes using the logical address to perform a table lookup to obtain a translated address (i.e. a physical address) and corresponding attributes. Therefore, when address translation is bypassed, the logical address is directly provided as the translated address (rather than the translated address from the lookup table) prior to provision of the corresponding attributes (since the corresponding attributes are not available until the table lookup is complete). By providing the logical address directly as the translated address, the translated address is valid earlier in a clock cycle as compared to a translated address generated by address translation, which would typically be valid later in the clock cycle, together with the corresponding attributes. By directly providing the logical address as the translated address earlier, memories receiving this translated address can have a longer set up time and can begin processing sooner.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Therefore, each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Figure 1:
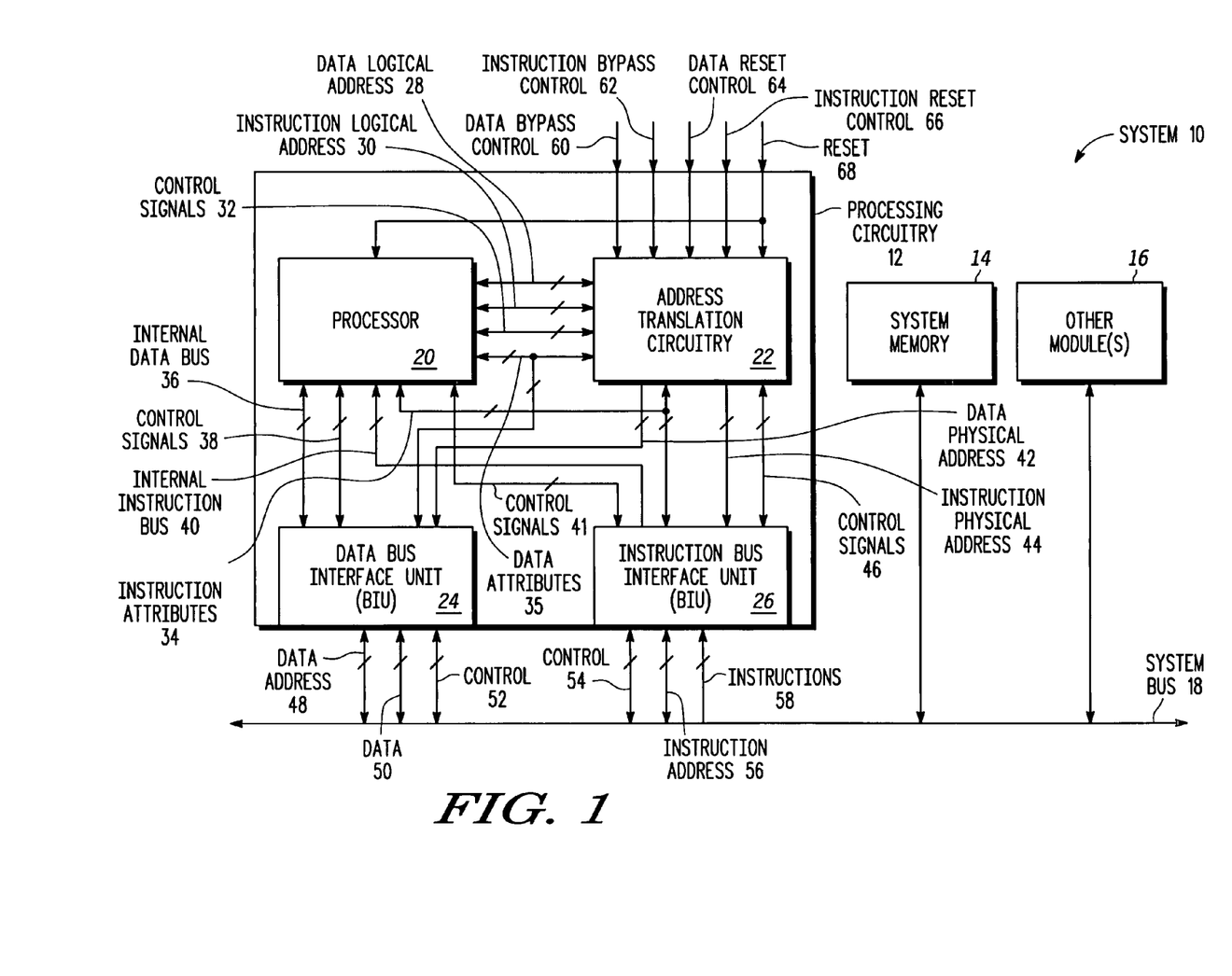
FIG. 1 illustrates a block diagram of a system in accordance with one embodiment of the present invention.

FIG. 1 illustrates a data processing system 10 in accordance with one embodiment of the present invention. System 10 includes processing circuitry 12, system memory 14, other module(s) 16, and system bus 18. Each of processing circuitry 12, system memory 14, and other module(s) 16 are bidirectionally coupled to system bus 18. System memory 14 may be any type of memory, such as, for example, a read only memory (ROM), a random access memory (RAM) such as a static RAM or dynamic RAM, non-volatile memory (e.g. Flash), etc. System 10 may include no other modules (in which case other module(s) 16 would not be present) or may include any number of other modules, where these modules may include, for example, other processing circuitries, peripherals, memories, I/O devices, etc.

Processing circuitry 12 of system 10 includes processor 20, address translation circuitry 22, data bus interface unit (BIU) 24, and instruction bus interface unit (BIU) 26. Data BIU 24 provides data addresses to system bus 18 via data address 48, provides and receives data to and from system bus 18 via data 50, and provides and receives control signals to and from system bus 18 via control 52. Instruction BIU 26 provides instruction addresses to system bus 18 via instruction address 56, provides and receives instructions to and from system bus 18 via instructions 58, and provides and receives control signals to and from system bus 18 via control 54.

Processor 20 is coupled to data BIU 24 via internal data bus 36, control signals 38, and data attributes 35. Processor 20 is coupled to address translation circuitry 22 via data logical address 28, instruction logical address 30, control signals 32, data attributes 35, and instruction attributes 34. Processor 20 is coupled to instruction BIU 26 via internal instruction bus 40, control signals 41, and instruction attributes 34. Address translation circuitry 22 is coupled to instruction BIU 26 via instruction attributes 34, control signals 46, and instruction physical address 44. Processing circuitry 12 also receives external signals data bypass control 60, instruction bypass control 62, data reset control 64, instruction reset control 66, and reset 68. These signals may be provided from other module(s) 16 within system 10 or they may be provided from sources external to system 10. Also, each of these external signals is provided to address translation circuitry 22, and reset 68 is also provided to processor 20. In one embodiment, one or more of these signals can also be provided by processor 20 to address translation circuitry 22. Note that any of these signals are optional, and thus may not be present in system 10. Also, processing circuitry 12 may receive other external signals not illustrated in FIG. 1.

Each of processor 20, data BIU 24, and instruction BIU 26 operate as known in the art and therefore will not be discussed in more detail herein. Note that processor 20 can be any type of processor such as, for example, a microcontroller, a digital signal processor, a direct memory access unit, a central processing unit, etc., and may include any type of processing logic for performing data processing and for performing any other desired function in addition to data processing. Therefore, address translation circuitry 22 may be external to processor 20 and coupled to the processing logic. In an alternate embodiment, address translation circuitry 22 may be located within processor 20 (and coupled to the processing logic). Also, in an alternate embodiment, data BIU 24 and instruction BIU 26 may be implemented as a single BIU communicating data and instruction addresses, data and instructions, and control with system bus 18. System bus 18 is illustrated as a single bus, but may also be implemented as having separate address, data, and control busses. Also, note that processing circuitry 12 may include other circuitry in addition to the illustrated boxes and signals. Operation of address translation circuitry 22 will be discussed in further detail in reference to FIGS. 2-6 below.

Figure 2:
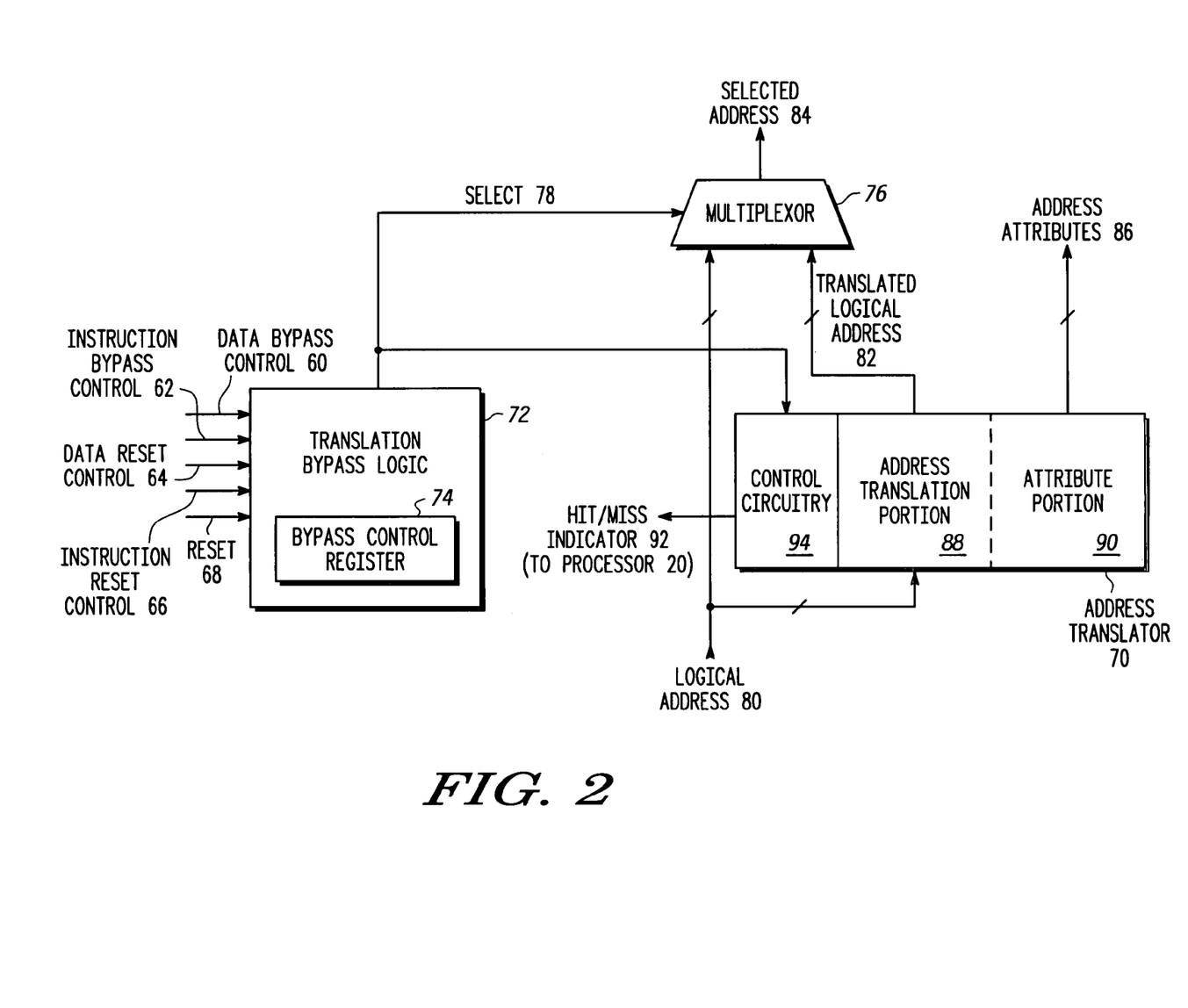
FIG. 2 illustrates at least a portion of the address translation circuitry of FIG. 1 in accordance with one embodiment of the present invention.

FIG. 2 illustrates at least a portion of address translation circuitry 22 in accordance with one embodiment of the present invention. Address translation circuitry 22 includes translation bypass logic 72, multiplexor (MUX) 76, and address translator 70. Address translator 70 includes control circuitry 94, address translation portion 88, and attribute portion 90. Address translator 70 receives logic address 80 and provides a hit/miss indicator 92, a translated logical address 82 (also referred to as a physical address), and address attributes 86. Translation bypass logic 72 includes a bypass control register 74. Translation bypass logic 72 receives data bypass control 60, instruction bypass control 62, data reset control 64, instruction reset control 66, and reset 68. (Note that, as stated above, any of these signals may be optional and therefore not provided to translation bypass logic 72.) Translation bypass logic 72 provides select 78 to a control input of MUX 76, and optionally provides select 78 to address translator 70. MUX 76 receives logical address 80 at a first input and receives translated logical address 82 at a second input, and provides one of these, based on select 78 (also referred to as a bypass enable control signal), as selected address 84. Note that translated logical address 82, output from address translator 70, may also be referred to as the physical address where MUX 76 provides either provides the physical address or logical address 80 as selected address 84. Also, MUX 76 can be replaced with any type of circuitry which is capable of providing logical address 80 as selected address 84 when bypassing is enabled.

In one embodiment, address translator 70 includes a lookup table where control circuitry 94 compares incoming logical address 80 with entries in the lookup table to determine if a match is found. If a match is found in the lookup table, hit/miss indicator 92 is asserted, and corresponding translated logical address 82 and address attributes 86 are output from the lookup table. For example, in one embodiment, a content addressable memory (CAM) portion is used to store logical addresses, where each CAM entry has a corresponding physical address entry (within address translation portion 88) and corresponding address attributes entry (within attribute portion 90). Therefore, in one embodiment, the translated addresses and corresponding attributes are implemented as a single lookup table. Alternatively, separate lookup table may be implemented for providing translated logical address 82 and corresponding address attributes 86. In this embodiment, control circuitry 94 uses logical address 80 to perform a lookup in each of the lookup tables. In alternate embodiments, lookup tables may be implemented as direct-mapped or set-associative arrays which cache address translation information. In yet another alternate embodiment, other circuitry other than lookup tables may be used to provide translated logical address 82 and address attributes 86. For example, translated logical address 82 may be generated algorithmically from logical address 80.

The embodiment of address translation circuitry 22 illustrated in FIG. 2 may be used for either data or instruction address translation. For example, logical address 80 may correspond to either data logical address 28 or instruction logical address 30, where selected address 84 may correspond to either data physical address 42 provided to data BIU 24 of FIG. 1 or to instruction physical address 44 provided to instruction BIU 26 of FIG. 1, respectively, and address attributes 86 may correspond to either data attributes 35 (provided to processor 20 or data BIU 24 or both) or instruction attributes 34 (provided to processor 20 or instruction BIU 26 or both), respectively. Therefore, note that some or all of the circuitry of FIG. 2 can be duplicated to translate both data and instruction addresses.

For example, in one embodiment, address translation circuitry 22 may include separate data and instruction address translation circuitry, each including some or all of the circuitry generically illustrated in FIG. 2. For example, address translation circuitry 12 may include separate address translators (each similar to address translator 70) for data and instruction addresses, where data logical address 28 would be input to one address translator and instruction logical address 30 would be input to the other. The address translator receiving data logical address 28 would also provide data attributes 35, and the address translator receiving instruction logical address 30 would also provide instruction attributes 34. Address translation circuitry 22 may also include separate MUXes or separate selection circuitry, similar to MUX 76, coupled to each of the separate address translators for outputting a data physical address or data logical address as a selected data address to data BIU 24 and for outputting an instruction physical address or an instruction logical address as a selected instruction address to instruction BIU 26. Furthermore, in this embodiment, each address translator may provide its own hit/miss indicator, similar to hit/miss indicator 92 (where any hit/miss indicators may be provided to processor 20 as one or more of control signals 32). In one embodiment, translation bypass logic 72 may be shared by both the data translation circuitry and instruction translation circuitry, as is illustrated in FIG. 2, where translation bypass logic receives both instruction and data control signals, and where bypass control register 74 includes both data and instruction bypass control fields. However, even if translation bypass logic 72 is shared, translation bypass logic 72 may output separate select signals or bypass control signals, similar to select 78, for each separate MUX in order to independently control address translation based upon whether the address is an instruction address or data address. In another embodiment, though, the circuitry of FIG. 2 can be fully replicated for each of the instruction and data address translation circuitry such that the translation bypass logic is specific to instructions or data. In this embodiment, translation bypass logic may receive only data or only instruction controls and bypass control register may only include data or instruction bypass control fields.

As described above, the circuitry of FIG. 2 can apply to either instructions or data. Therefore, in the following discussion describing operation of FIG. 2, note that the descriptions can apply analogously to data and instruction address translation. Referring to operation of FIG. 2, translation bypass logic 72 provides select 78 to MUX 76 to select one of translated logical address 82 (output from address translator 70) or logical address 80 to provide as selected address 84. Note that selected address 84 may also be referred to as the translated address, where the translated address corresponds to either translated logical address 82 output from address translator 70 or logical address 80 which is provided directly as the translated address.

Still referring to FIG. 2, if translation bypass logic 72, based on values in bypass control register 74, is to bypass address translation, select 78 is provided such that MUX 76 selects logical address 80 to be provided as selected address 84. Therefore, in the case in which bypass is performed, logical address 80 is provided directly as selected address 84. That is, logical address 80 is provided directly as the translated address rather than translated logical address 82. However, in the illustrated embodiment, even if logical address 80 is provided directly as selected address 84, logical address 80 is still provided to address translator 70 which provides translated logical address 82 and address attributes 86. Note that translated logical address 82 and address attributes 86 are provided later in time than selected address 84 when bypass is performed, because logical address 80 propagates to selected address 84 through MUX 76 faster than translated logical address 82 and address attributes 86 are provided by address translator 70. For example, in the embodiment where a lookup table is used to provide translated logical address 82 and address attributes 86, the lookup itself causes a delay. However, since MUX 76 is set to select logical address 80 to provide as selected address 84, translated logical address 82 gets ignored. However, address translation still occurs, and attributes 86 are still provided at the completion of the address translation.

In one embodiment, regardless of the determination of translation bypass logic 72 as to which of logical address 80 and translated logical address 82 is selected and provided as selected address 84, address translator 70 still performs address translation of logical address 80. As part of operation of address translator 70, a lookup may fail to find a corresponding address translation, resulting in a "miss" event. The success or failure of the translation process performed by address translator 70 is signaled via hit/miss indicator 92 to processor 20. Processor 20 may utilize hit/miss indicator 92 to effect exception processing or other alternative activity in response to a "miss" indication signaled via hit/miss indicator 92. Again, in this embodiment, the address translation and hit/miss signaling performed by address translator 70 occurs independently of the operation of translation bypass logic 72.

Figure 3:
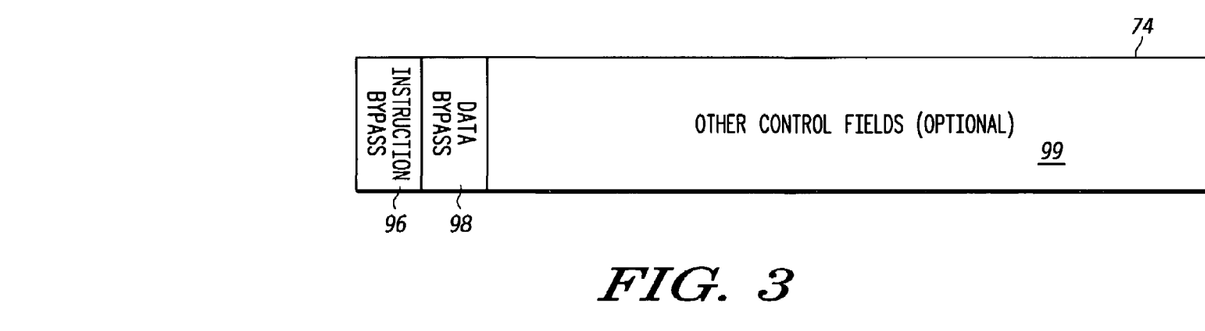
FIG. 3 illustrates the bypass control register of FIG. 2 in accordance with one embodiment of the present invention.
Figure 4:
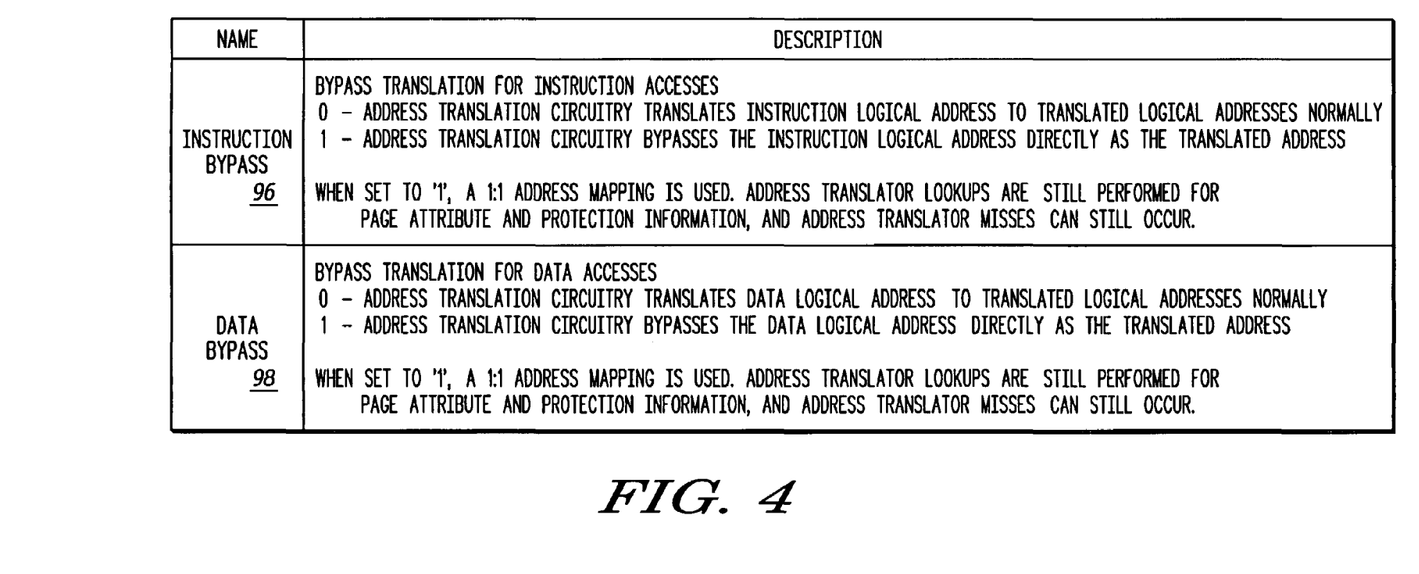
FIG. 4 illustrates a table providing descriptions for the instruction bypass and data bypass fields of the bypass control register of FIG. 3.

Translation bypass logic 72 determines the value of select 78 based on values stored within bypass control register 74 and values of instruction bypass control 62 and data bypass control 60, if present. FIG. 3 illustrates one embodiment of bypass control register 74 having an instruction bypass field 96 and a data bypass field 98. Note that bypass control register 74 may, in some embodiments, include one or more other control fields 99. FIG. 4 illustrates a table which provides descriptions for each of the bypass fields. In one embodiment, each bypass field is a one-bit field. For example, instruction bypass field 96 may be a logic level 0 or a logic level 1 and applies in the case of an instruction address translation. A logic level 0 indicates that address translation circuitry 22 translates the instruction logical address to an instruction translated logical address (i.e. an instruction physical address) normally. That is, in this case, translation bypass logic 72 would set select 78 such that translated logical address 82 is output as selected address 84. A logic level 1, though, indicates that address translation bypass is to occur where address translation circuitry 22 bypasses the instruction logical address directly as the translated address. That is, in this case, translation bypass logic 72 would generate select 78 such that logical address 80 is output directly as selected address 84. Also, when set to a logic level 1, note that translated logical address 82 (i.e. the physical address) output by address translator 70 is ignored, and in effect, a 1 to 1 mapping of logical address 80 is used. However, in one embodiment which uses lookup tables for address translation, address translator lookups are still performed by address translator 70 in order to provide corresponding address attributes 86. Also, since in this embodiment address translator lookups still occur, address translator misses can still occur.

In an alternate embodiment, select 78 is also provided to address translator 70. In this embodiment, when instruction bypass 96 is a logic level 1, control circuitry 94 may use select 78 to disable address translation portion 88 so that only attributes 86 are provided and translated logical address 82 is not provided at all. That is, in this alternate embodiment, although the address translation portion 88 is disabled, one or more address attributes are still created or provided.

Note that the above descriptions provided above with respect to instruction bypass 96 apply analogously to data bypass 98. For example, data bypass field 98 may be a logic level 0 or a logic level 1 and applies in the case of a data address translation. That is, when set to a logic level 0, address translation circuitry 22 translates a data logical addresses to a data translated logical address (i.e. a data physical address) normally. That is, translated logical address 82 is provided as selected address 84. When set to a logic level 1, though, address translation bypass is to occur where address translation circuitry 22 bypasses the data logical address directly as the translated address. That is, in this case, translation bypass logic 72 would generate select 78 such that logical address 80 is output directly as selected address 84. Also, when set to a logic level 1, note that translated logical address 82 (i.e. the physical address) output by address translator 70 is ignored, and in effect, a 1 to 1 mapping of logical address 80 is used. However, in one embodiment which uses lookup tables for address translation, address translator lookups are still performed by address translator 70 in order to provide corresponding address attributes 86. Also, since in this embodiment address translator lookups still occur, address translator misses can still occur.

Figure 5:
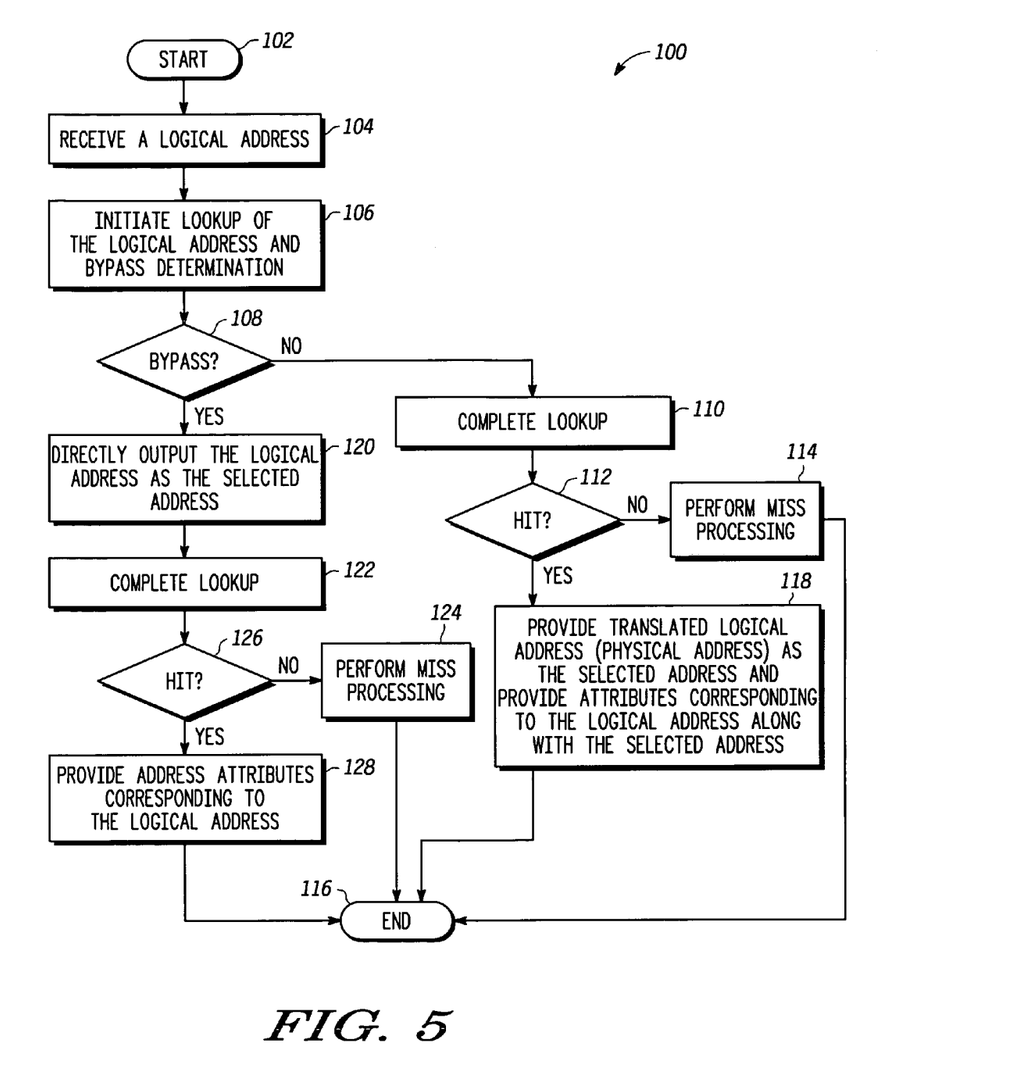
FIG. 5 illustrates a flow diagram illustrating a method for address translation using bypass capable of being performed by the system of FIG. 1 in accordance with one embodiment of the present invention.

Operation of FIG. 2 will be described in more detail in reference to flow 100 of FIG. 5 which can apply to either instruction or data address translation. Also, flow 100 illustrates an embodiment in which address translator 70 is implemented as a single lookup table in which a logical address is compared against entries, and, if a hit occurs, a corresponding translated logical address (i.e. physical address) and corresponding attributes are provided.

Flow 100 begins with start 102 and flows to block 104 where a logical address, such as logical address 80, is received. (Again, note that logical address 80 can refer to either a data logical address or an instruction logical address.) For example, this logical address is received from processor 20 (as data logical address 28 or instruction logical address 30). Flow then proceeds to block 106 where a lookup of the logical address is initiated and bypass determination is initiated. Therefore, control circuitry 94 begins comparing logical address 80 to entries in the lookup table of address translator 70 and translation bypass logic 72 begins determining the value of select 78. (In some embodiments, translation bypass logic 72 may have determined the value of select 78 prior to receiving logical address for translation lookup.)

Flow proceeds to decision diamond 108 where it is determined whether a bypass should occur. For example, translation bypass logic may use the value of data bypass field 98 or instruction bypass field 96, depending on whether a data or instruction logic address is received as the logical address, to determine whether bypass is to occur and may generate a bypass control signal, such as select 78, accordingly. If bypass is not to occur, flow proceeds to block 110 where the address lookup is completed. Flow proceeds to decision diamond 112 where it is determined whether a hit has occurred. That is, if logical address 80 is found to match an entry of the lookup table of address translator 70 then a hit occurs; otherwise a miss occurs. Therefore, if a hit does not occur (indicating a miss), flow proceeds to block 114 where miss processing is performed. For example, in one embodiment, hit/miss indicator 92 is set to indicate a miss (which may correspond, for example, to setting hit/miss indicator 92 to a logic level 0). Indicator 92 can then be provided to processor 20 (via, for example, control signals 32) where processor 20 may perform miss processing. Any miss processing for the received logical address, as is known in the art, can be performed and thus will not be described in more detail herein.

Referring back to decision diamond 112, if a hit occurs, i.e. logical address 80 is found to match an entry within the lookup table of address translator 70, then flow proceeds to block 118 were the translated logical address (i.e. physical address) is provided as the selected address and where the attributes corresponding to the logical address are provided with the selected address. That is, for example, the lookup is complete and translated logical address 82 is provided as selected address 84. (Since translation bypass logic 72 has determined that bypass is not occur, translation bypass logic 72 sets select 78 to select translated logical address 82.) Also, at substantially the same time as translated logical address 82 is provided as selected address 84, address attributes 86 are also provided. Therefore, in the case where bypass is not performed, the address attributes are provided at substantially the same time as the translated logical address, since both are provided as a result of the address lookup. Flow 100 then ends at end 116.

Referring back to decision diamond 108, if translation bypass logic 72 determines that bypass is to occur, flow proceeds from decision diamond 108 to block 120 where the logical address is directly output as the selected address. That is, translation bypass logic 72 can set select 78 such that logical address 80 is output as selected address 84. Flow then proceeds to block 122 where the lookup is completed. Therefore, note that selected address 84 is provided prior to completion of the address lookup. That is, logical address 80 is provided directly as the translated logical address (as selected address 84) rather than waiting for the address lookup to complete. In this case, the actual translated logical address 82 provided as a result of the lookup is ignored. However, since the lookup is still performed, even though translated logical address 82 is ignored, a hit or miss is still determined.

Therefore, flow proceeds to decision diamond 126 where it is determined if a hit or miss has occurred. If a hit does not occur (indicating a miss), flow proceeds to block 124 where miss processing is performed. For example, in one embodiment, hit/miss indicator 92 is set to indicate a miss (which may correspond, for example, to setting hit/miss indicator 92 to a logic level 0). Indicator 92 can then be provided to processor 20 (via, for example, control signals 32) where processor 20 may perform miss processing. Any miss processing, as known in the art, can be performed and thus will not be described in more detail herein.

However, if at decision diamond 126, a hit does occur, flow proceeds to block 128 where the address attributes corresponding to the logical address are provided. That is, address attributes 86, provided as a result of completing the lookup, are provided at some time after logical address 80 was directly provided as the translated logical address (i.e. as selected address 84). Also, note that the hit/miss indicator is also provided at some time after logical address 80 was directly provided as selected address 84. In one embodiment, the logical address in block 120 of flow 100 and the corresponding attributes in block 128 are provided at different times (with the logical address being provided directly as the translated logical address prior to providing the corresponding attributes), but within a same clock cycle. Alternatively, the corresponding attributes may be provided in a subsequent clock cycle. Flow then ends at end 116.

Note that the corresponding address attributes may include any number and any type of attributes, permissions, or any combination thereof. For example, the corresponding attributes may include guarded, cacheable, Endianness, instruction set selection, memory coherence required, shared, read/write/execute permissions, etc. Also, one or more of these attributes can be provided to processor 20 via, for example, control signals 32. Also, one or more of these attributes can be provided to each of data BIU 24 and instruction BIU 26, as needed. In one embodiment, one or more of the attributes may also be supplied to system bus 18 via control 52 of data bus interface 24, or via control 54 of instruction bus interface 26, or may be used to determine the values of other control signals supplied by control 54 or control 52 to system bus 18. In addition, one or more of the attributes may be supplied to other logic within processing circuitry 12 or data processing system 10.

Although flow 100 was described in reference to performing an address lookup but ignoring the translated logical address resulting from the address lookup in the case of using bypass, in an alternate embodiment, address translation can be disabled such that a translated logical address output from address translator 70 is not provided. However, in this example, address attributes 86 may still be provided. Disabling of address translation in this example may result in reduced power consumption, or earlier provision of address attributes 86 from the address lookup process.

Figure 6:
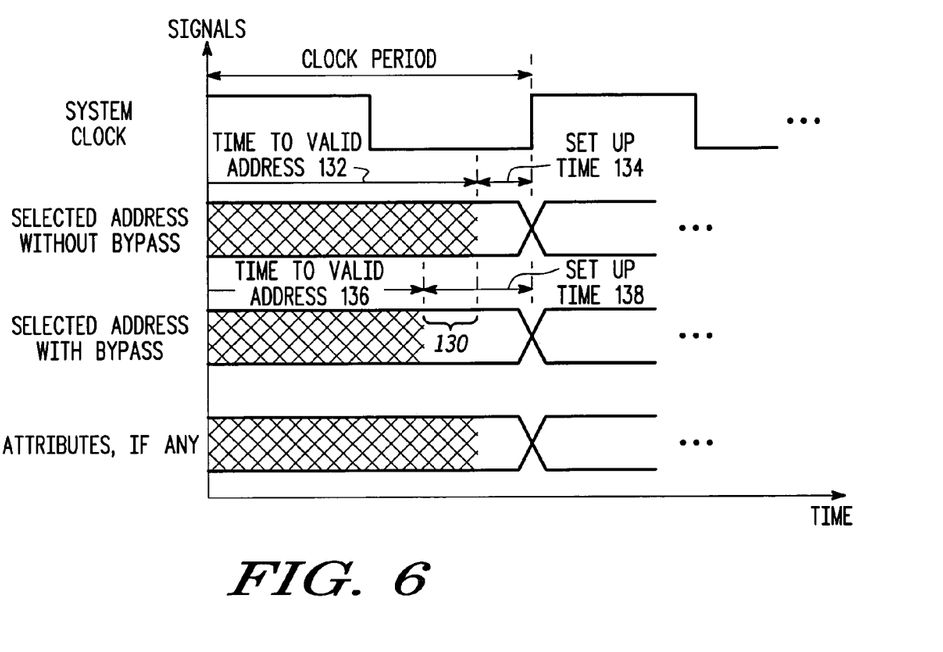
FIG. 6 illustrates a timing diagram illustrating a sample system clock cycle in accordance with one embodiment of the present invention.

FIG. 6 illustrates a timing diagram which illustrates example timing of a system clock, a selected address without using bypass, a selected address with bypass, and attributes, if any. Note that when bypass is not used and translated logical address 82 is provided as selected address 84, the time to a valid address 132 as measured from the start of the current clock cycle is fairly long, leaving only a short set up time 134. That is, set up time 134 is the time available for a memory receiving the selected address to prepare for the following clock cycle to properly use the received selected address. However, when bypass is used and logical address 80 is provided directly as selected address 84, the time to a valid address 136 as measured from the start of the current clock cycle is shorter compared to time to a valid address 132. Therefore, set up time 138 is longer, allowing more time for the memory receiving the selected address to prepare for the next clock cycle. Therefore, the difference 130 in the time required for the selected address to become valid when not using bypass versus using bypass allows for a greater set up time. Also, in some cases, when bypass is not used, set up time 134 may not be sufficient for a particular memory, thus requiring the system clock to be operated at a lower frequency by stretching the clock period. This, in turn, reduces performance. Therefore, the ability to bypass may prevent the need for operating the system clock at a lower frequency. Also, note that if any attributes are provided, they are valid at the same time a selected address without bypass would be valid since, in one embodiment, address translation (e.g. a lookup) has to be completed to provide the attributes. However, in many cases, the attributes are used only within processing circuitry 12 and not provided to the memory receiving the selected address. Therefore, the timing of the address attributes is not as important from the point of view of the memory receiving the selected address as the timing of the selected address itself. Therefore, by using bypass, the selected address is valid earlier in the clock cycle than the attributes, possibly allowing for improved performance.

As described above in reference to flow 100, translation bypass logic 72 may use the values in bypass control register 74 to determine whether to allow bypass or not. In one embodiment, bypass control register 74 is implemented as a register which stores a plurality of programmable bits. Alternatively, the information stored within bypass control register 74 can be stored in an type of storage circuitry and can be located anywhere within processing circuitry 12 or system 10. In one embodiment, bypass control register 74 can be set to predetermined values (such as default values) upon reset or can be programmed by translation bypass logic 72 or processor 20. In one embodiment, upon reset (provided by reset 68), translation bypass logic 72 may poll data reset control 64 and instruction reset control 66 in order to determine what values to store in data bypass field 98 and instruction bypass field 99, respectively. For example, in one embodiment, the values of data reset control 64 and instruction reset control 66 can be stored to data bypass field 98 and instruction bypass field 99, respectively. Note that reset 68 can be provided via an input external to system 10 or can be provided from within system 10. Reset 68 may be used to reset all of system 10 or only a portion of system 10. For example, reset 68 may be used to reset all or a portion of processing circuitry 12.

In yet another alternate embodiment, bypass control can be determined dynamically through the use of data bypass control 60 and instruction bypass control 62. For example, translation bypass logic 72, in determining, upon receipt of a logical address, whether to bypass or not, may first poll data bypass control 60 and instruction bypass control 62. In one embodiment, the values of data bypass control 60 and instruction bypass control 62 may be used to override the decision indicated by data bypass field 98 and instruction bypass field 99 in bypass control register 74. For example, a logic level 1 for either data bypass control 60 or instruction bypass control 62 may indicate to perform bypass, regardless of the values in bypass control register 74. Alternatively, a logic level 1 may indicate that the values in bypass control register 74 should be updated to indicate bypassing. In yet another alternate embodiment, bypass control register 74 may not be present at all and translation bypass logic 72 always uses bypass controls 60 and 62 to generate a bypass control signals such as select 78. Note that bypass control signals 60 and 62 can be provided via pins from a source external to system 10 or can be provided by processor 20 or other circuitry within system 10.

Also, note that the above embodiments have been described in reference to having separate bypass controls and translation circuitry for data and instruction addresses. However, in alternate embodiments, the control may be the same for both data and instruction addresses, or the bypass control function may be implemented for only one of instruction or data addresses.

By now it should be appreciated that there has been provided a processing system capable of address translation bypass. Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of may different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type. Furthermore, those skilled in the art will recognize that boundaries between the functionality of the above described operations merely illustrative. The functionality of multiple operations may be combined into a single operation, and/or the functionality of single operations may be distributed in additional operations. Moreover, alternative embodiments may include multiple instances of a particular operation, and the order of operations may be altered in various other embodiments.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "plurality", as used herein, is defined as two or more than two. The term another, as used herein, is defined as at least a second or more.

The term "coupled", as used herein, is defined as connected, although not necessarily directly, and not necessarily mechanically.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described.

Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

What is claimed is:

1. A data processing system comprising:
   an address translator for performing address translation, the address translator receiving a logical address and converting the logical address to a physical address and providing one or more address attributes; and
   bypass circuitry coupled to the address translator, the bypass circuitry selectively providing the logical address as a translated address of the logical address which was received, wherein the selectively providing is done prior to providing the one or more address attributes associated with the logical address.

2. The processing system of claim 1 wherein the address translator translates the logical address to a physical address concurrent with providing the one or more address attributes, but the physical address is not output by the bypass circuitry as the translated address.

3. The processing system of claim 1 wherein the bypass circuitry further comprises:
   a control register having one or more bits whose value determines whether the logical address which was received is provided by the address translator as the translated address prior to providing the one or more attributes associated with the logical address.

4. The processing system of claim 3 wherein the bypass circuitry further comprises a reset input wherein in response to receiving a reset signal a predetermined value is placed in the control register for controlling whether the physical address provided by the address translator is bypassed.

5. The processing system of claim 3 wherein the control register comprises a first bit whose value controls bypassing of translated physical address values when the logical address that is received is a logical address of an instruction and a second bit whose value controls bypassing of translated physical address values when the logical address that is received is a logical address of data.

6. The processing system of claim 3 wherein the bypass circuitry further comprises a reset input wherein in response to receiving a reset signal having a predetermined value, the bypass circuitry determines the value for the one or more bits.

7. The processing system of claim 1 wherein the bypass circuitry further comprises:
   a control input for receiving a bypass control signal whose value determines whether the logical address which was received is provided by the address translator as the translated address.

8. The processing system of claim 7 wherein the bypass control signal is coupled to the address translator, the control signal selectively disabling the address translator from providing a translated logical address while permitting the address translator to provide the one or more attributes associated with the logical address.

9. The processing system of claim 1 wherein the address translator further comprises:

an output for providing a hit/miss signal that indicates whether the address translator contains a value corresponding to the logical address that is received after selectively providing the logical address as the translated address.

10. A method of address translation in a data processing system comprising:
receiving a logical address;
initiating a translation of the logical address to a physical address and one or more attributes; and
selectively providing the logical address as a selected translated address in response to a control signal prior to making the one or more attributes available.

11. The method of address translation of claim 10 further comprising generating the control signal in response to a programmable control bit that is stored in a control register.

12. The method of address translation of claim 11 further comprising:
resetting the data processing system; and
setting the value of the programmable control bit to a predetermined value in response to said resetting.

13. The method of address translation of claim 10 further comprising disabling the translation of the logical address to a physical address but using the logical address to create the one or more attributes, said disabling being in response to the control signal.

14. The method of address translation of claim 10 further comprising:
receiving the logical address as a logical address of an instruction; and
receiving a second logical address, the second logical address being a data logical address that is translated in response to a second control signal,
wherein the control signal and the second control signal independently control address translation based upon whether an address is an instruction address or a data address.

15. A data processing system comprising:
processing logic for performing data processing; and
address translation circuitry coupled to the processing logic for performing address translation, the address translation circuitry comprising:
an address translator for receiving a logical address and converting the logical address to a physical address and one or more address attributes;
a select circuit for receiving the logical address and coupled to the address translator for receiving the physical address, the select circuit having a control input and an output for providing a selected address; and
bypass circuitry coupled to the select circuit, the bypass circuitry providing a control signal to the control input of the select circuit for selectively providing the logical address as the selected address prior to providing the one or more address attributes associated with the logical address, the bypass circuitry bypassing use of the physical address as the selected address.

16. The data processing system of claim 15 wherein the bypass circuitry further comprises:
a control register having a first control bit used for generating the control signal when the logical address is an instruction address and having a second control bit used for generating the control signal when the logical address is a data address.

17. The data processing system of claim 15 wherein the control signal is also coupled to the address translator, the control signal selectively disabling the providing of a physical address while the address translator translates the logical address to provide the one or more address attributes.

18. The data processing system of claim 15 wherein the bypass circuitry further comprises a reset input for receiving a reset signal, the reset signal determines a value for the control signal for selectively bypassing use of the physical address as the selected address.

19. The data processing system of claim 15 wherein the bypass circuitry further comprises:
a control signal input for receiving an input signal for use in generating the control signal.

20. The data processing system of claim 15 wherein the address translator determines whether the logical address that is received represents a hit or a miss of stored address values in the address translator, and generates a hit/miss signal in response thereto at an indicator output, the data processing system performing miss processing in response to a miss indication.

* * * * *